US010556636B2

(12) United States Patent
Chen

(10) Patent No.: US 10,556,636 B2
(45) Date of Patent: Feb. 11, 2020

(54) SELF-BALANCING LOAD BEARING VEHICLE

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 0 days.

(21) Appl. No.: 15/408,401

(22) Filed: Jan. 17, 2017

(65) Prior Publication Data

US 2017/0225736 A1 Aug. 10, 2017

Related U.S. Application Data

(60) Provisional application No. 62/279,791, filed on Jan. 17, 2016.

(51) Int. Cl.
| | | |
|---|---|---|
| *B62K 11/00* | (2006.01) | |
| *B62K 3/00* | (2006.01) | |
| *B62J 99/00* | (2009.01) | |
| *B62K 19/36* | (2006.01) | |
| *B62K 23/06* | (2006.01) | |
| *B62K 23/08* | (2006.01) | |

(52) U.S. Cl.
CPC .............. *B62K 11/007* (2016.11); *B62J 99/00* (2013.01); *B62K 3/005* (2013.01); *B62K 19/36* (2013.01); *B62K 23/06* (2013.01); *B62K 23/08* (2013.01); *B62J 2099/004* (2013.01); *B62J 2099/0013* (2013.01); *B62K 2207/00* (2013.01)

(58) Field of Classification Search
CPC ............................... B62K 11/007; B62J 99/00
See application file for complete search history.

(56) References Cited

U.S. PATENT DOCUMENTS

| | | | | |
|---|---|---|---|---|
| 5,971,091 | A | 10/1999 | Kamen et al. | |
| 6,302,230 | B1 * | 10/2001 | Kamen | A63C 17/01 180/171 |
| 6,311,794 | B1 * | 11/2001 | Morrell | A61G 5/04 180/8.3 |
| 7,635,041 | B2 * | 12/2009 | Adachi | B60L 15/20 180/218 |
| 7,823,676 | B2 * | 11/2010 | Yamada | G05D 1/0891 180/218 |
| 7,866,429 | B2 * | 1/2011 | Ishii | B62D 37/00 180/218 |
| 8,041,456 | B1 | 10/2011 | Blackwell et al. | |
| 8,170,780 | B2 * | 5/2012 | Field | B60N 2/045 152/209.27 |
| 8,170,781 | B2 * | 5/2012 | Fuwa | B62K 11/007 180/21 |
| 8,271,185 | B2 | 9/2012 | Doi | |

(Continued)

FOREIGN PATENT DOCUMENTS

| | | |
|---|---|---|
| DE | 102007023283 | 11/2008 |
| GB | 2438826 | 12/2007 |

*Primary Examiner* — Joseph M Rocca
*Assistant Examiner* — Michael R Stabley
(74) *Attorney, Agent, or Firm* — Steven J. Sullivan

(57) ABSTRACT

A self-balancing load-bearing device having a load platform or like structure that may move relative to the drive wheel or wheels under the force of gravity as the device operates. The load platform may be mounted with a pendulum based structure including curved support tracks or pendulum arms or a related structure. User input of control signals may be achieved with a joystick, foot pedal, remote control or other. Various embodiments and uses are disclosed.

14 Claims, 3 Drawing Sheets

(56) References Cited

U.S. PATENT DOCUMENTS

| | | | | |
|---|---|---|---|---|
| 8,322,478 | B2* | 12/2012 | Kim | B62K 11/007 180/218 |
| 8,467,941 | B2* | 6/2013 | Field | B60N 2/045 180/167 |
| 8,490,723 | B2 | 7/2013 | Heinzmann et al. | |
| 8,522,902 | B2* | 9/2013 | Gomi | B62J 1/005 180/208 |
| 8,640,807 | B2* | 2/2014 | Takenaka | B62K 11/007 180/218 |
| 8,725,355 | B2* | 5/2014 | Quick | B62K 11/007 180/22 |
| 8,763,733 | B2* | 7/2014 | Hamaya | B62K 1/00 180/208 |
| 9,101,817 | B2* | 8/2015 | Doerksen | A63C 17/12 |
| 9,499,228 | B2* | 11/2016 | Chang | B62K 3/002 |
| 9,511,811 | B2* | 12/2016 | Andreev | B60G 21/05 |
| 9,598,136 | B1* | 3/2017 | Kim | B62K 21/00 |
| 9,759,267 | B2* | 9/2017 | Wiley | F16D 7/027 |
| 9,908,573 | B2* | 3/2018 | Wiley | B62D 61/06 |
| 2008/0105481 | A1* | 5/2008 | Hutcheson | B25J 5/007 180/209 |
| 2008/0164083 | A1* | 7/2008 | Miki | B60L 15/20 180/165 |
| 2009/0108553 | A1 | 4/2009 | Serai | |
| 2010/0114468 | A1 | 5/2010 | Field et al. | |
| 2010/0168993 | A1 | 7/2010 | Doi et al. | |
| 2011/0098884 | A1* | 4/2011 | Doi | B62K 11/007 701/36 |
| 2012/0166048 | A1 | 6/2012 | Inoue et al. | |

* cited by examiner

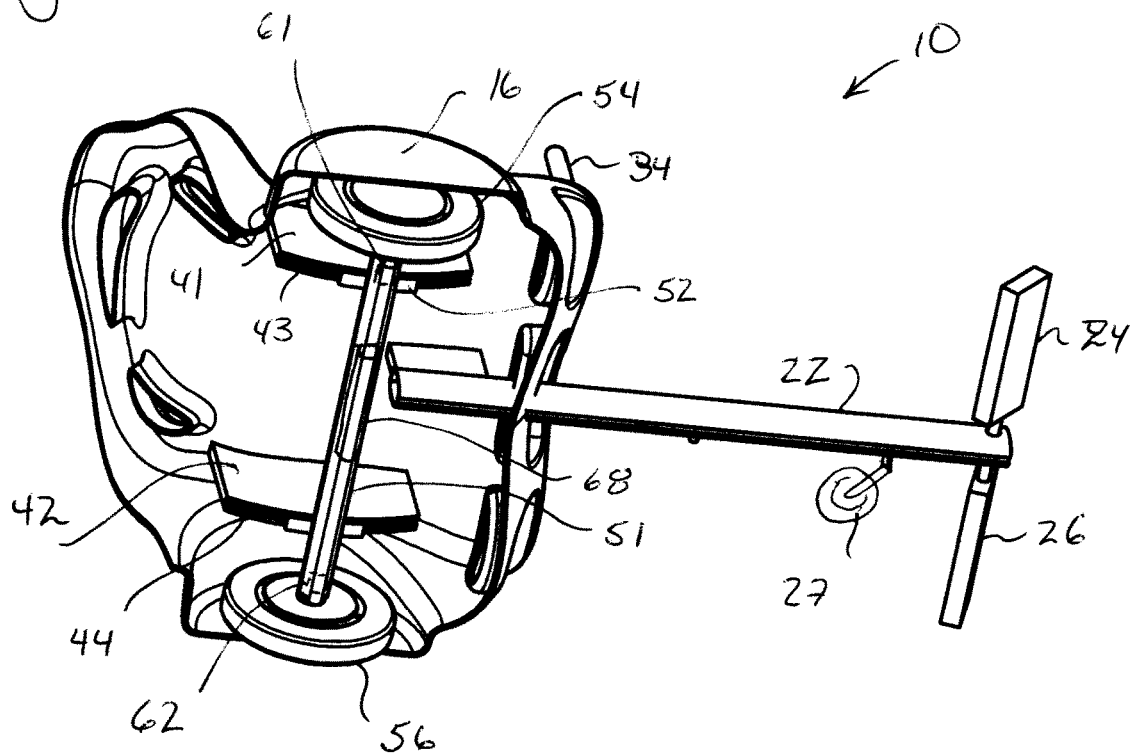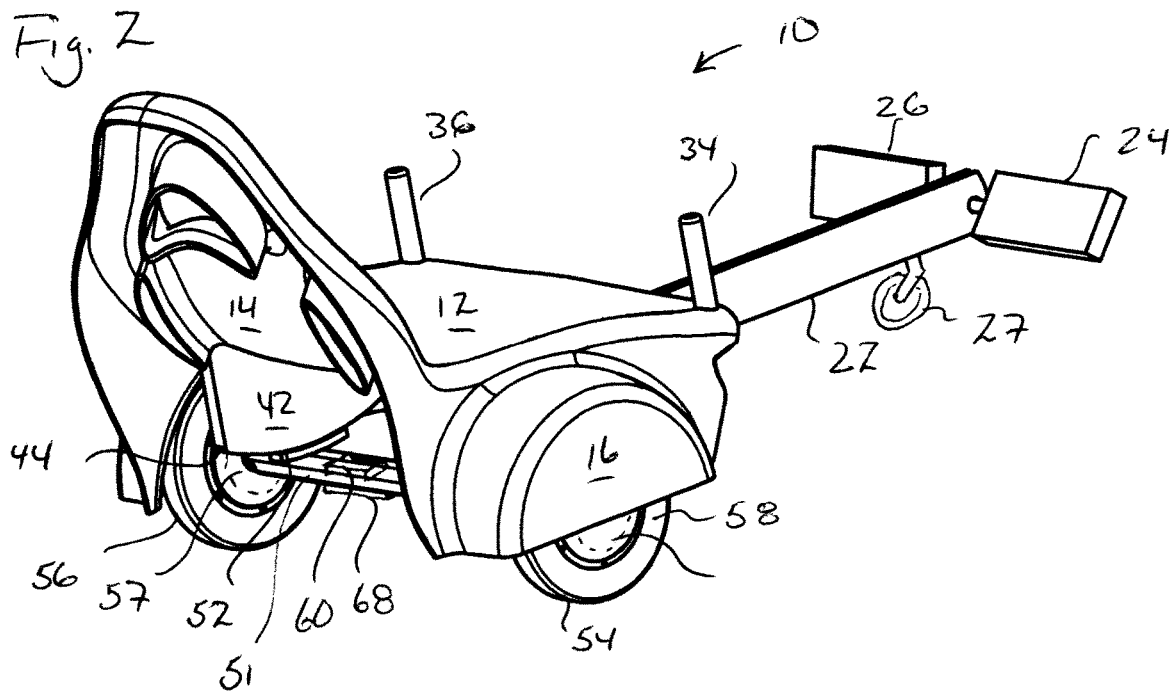

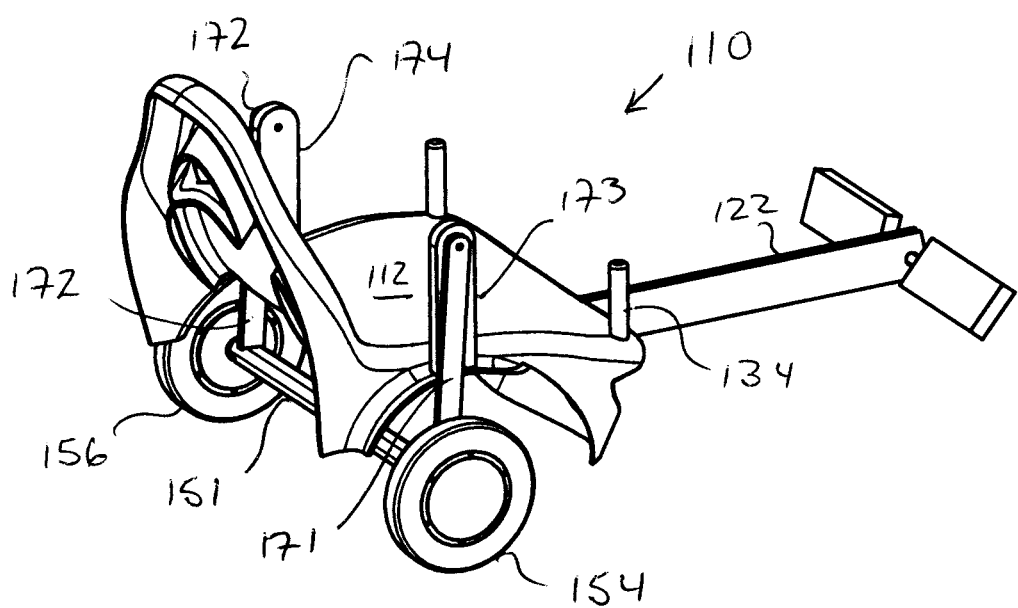

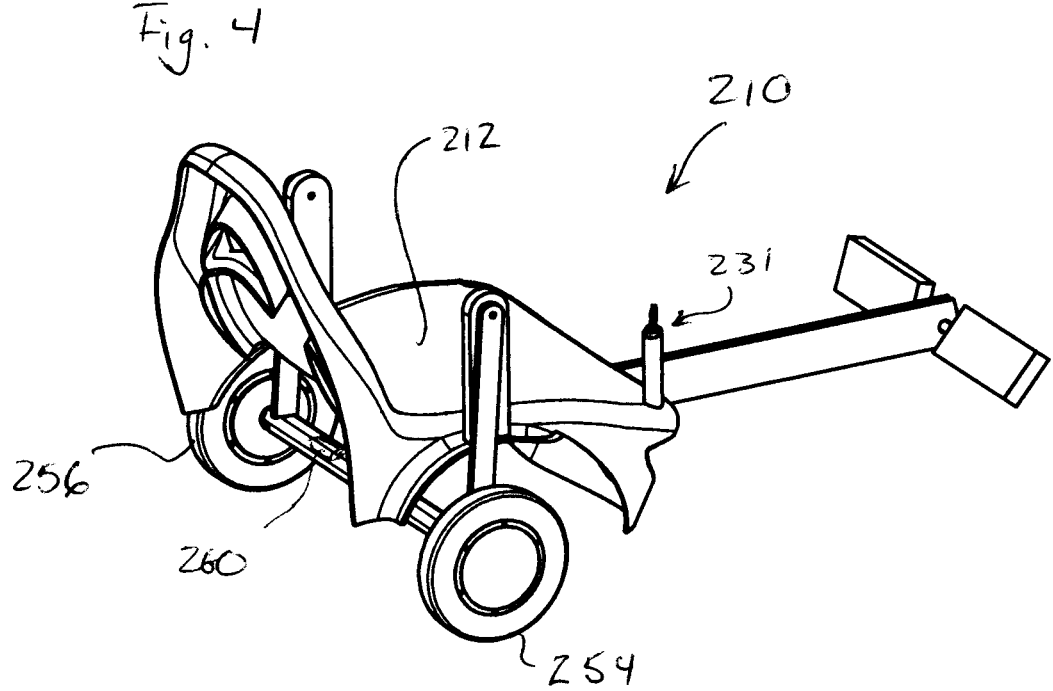

SELF-BALANCING LOAD BEARING VEHICLE

CROSS REFERENCE TO RELATED APPLICATIONS

The present application claims the benefit of provisional application No. 62/279,791, filed Jan. 17, 2016, for a Self-Balancing Vehicle with Seat Movable Relative to Wheels by the inventor herein.

FIELD OF THE INVENTION

The present invention relates to "self-balancing" or "auto-balancing" load-bearing devices. More specifically, the present invention relates to such devices implemented using an inverted pendulum principle and having a load bearing platform that is movable relative to the wheels.

BACKGROUND OF THE INVENTION

The prior art includes U.S. Pat. No. 8,490,723 issued to Heinzmann et al., for an Apparatus and Methods for Control of a Vehicle (the '723 patent). This patent discloses a device having self-balancing and a support or load platform that is movable relative to the wheels. It should be recognized that movement of the load platform relative to the wheels is performed (in this class of device) to achieve a desired shifting of the center of gravity of the load as the device accelerates in the fore or aft direction.

In the '723 patent, the movement of the load platform (or its equivalent) relative to the frame or platform to which the wheels are coupled is achieved with a controller, actuator and corresponding track system. In response to control signals, the actuator precisely positions the load platform along the track as the vehicle moves.

This arrangement, however, is disadvantageous for several reasons. One is that the controller, actuator, 10 batteries, and precise-position track assembly increase the complexity of the device and hence the likelihood of device malfunction. Another is that they add to the weight, bulk and cost of the device.

U.S. Pat. No. 8,271,185, issued to Doi for a Vehicle (the '185 patent) and U.S. Patent Application no. 2010/0168993, also to Doi, disclose a vehicle in which the position of a weight or counter-balance is moved to adjust the center of gravity of the load relative to the wheels. This requires a controller, actuator, battery, weight-movement mechanical linkage, and the weight itself. Similar to the '723 patent, these components disadvantageously add to the weight, cost and potential failure of the device.

Thus a need exists in a self-balancing vehicle with a manner of moving or adjusting the center of gravity relative to the wheels that is simpler, less expensive, less likely to fail and/or easier to work with, among other needed attributes.

SUMMARY OF THE INVENTION

Accordingly, it is an object of the present invention to provide a self-balancing vehicle that overcomes the shortcomings of the prior art.

It is another object of the present invention to provide a self-balancing vehicle that utilizes a pendulum principle to transfer a center of gravity of a load. Since a self-balancing vehicle functions as an inverted pendulum this may include a pendulum supported load within the inverted pendulum based self-balancing device.

It is also an object of the present invention to provide multiple embodiments of implementing the pendulum based transfer of the center of gravity of the load, including a curved track upon which the load may move, a dependent pendulum structure or other embodiments that invoke the same or related principles.

These and related objects of the present invention are achieved by use of a self-balancing pendulum-supported load-bearing vehicle as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 1 and 2 are a perspective bottom view and perspective rear-side view of a self-balancing load-bearing transportation device in accordance with the present invention.

FIG. 3 is a rear-side perspective view of another embodiment of a self-balancing load-bearing device having pendulum arms in accordance with the present invention.

FIG. 4 is a rear-side perspective view of another embodiment of a self-balancing load-bearing device supporting remote control in accordance with the present invention

DETAILED DESCRIPTION

Referring to FIGS. 1 and 2, a perspective bottom view and perspective rear-side view of a self-balancing load-bearing transportation device 10 in accordance with the present invention is shown. Device 10 may include a load-bearing member or platform, here that member or platform is configured as a seat 12. A seat back 14 and wheel covers/housing 16 may also be provided, formed separately or integrally.

A leg shaft 22 may extend from the seat and support right and left foot platforms or pedals 24, 26. The foot pedals may be foot rests and/or be used for device control, as discussed below. A front wheel 27 may be coupled to leg shaft 22. This wheel supports the device at rest or if self-balancing fails, etc. It preferably does not contact the riding surface during normal use.

Right and left side joysticks 34, 36 are preferably located at the right and left front edges of the seat, for ready contact with a rider's hands. If wheel control is input through foot pedals 24, 26, then the "joysticks" may be implemented as handholds only. Conversely, if the joysticks provide user control of wheel drive, then the pedals may be foot rests only. Various arrangements of user input devices may be implemented without departing from the present invention. Furthermore, while two joysticks are shown, a single joystick may be used and it may be centrally located or as joystick 34 or 36 or elsewhere located.

Attached to the seat 12 (or other load platform) are two members 41, 42 that hold and/or define tracks 43, 44, respectively. Tracks or rails 43, 44 preferably have a curved shape. The configuration of these tracks is discussed in more detail below.

A wheel support or frame 50 is positioned, at least in part, below the tracks 43, 44. Wheel support 50 may include a shaft 51 to which are coupled right and left wheels 54, 56. These wheels preferably have hub motors 55, 57, respectively, and tires 58 that rotate about the hubs.

Two slidable track couplers 52 are preferably fixedly mounted to shaft 51 and slidably coupled to tracks 43, 44. The position of slidable couplers 52 along the tracks can move, and hence the position of the seat (coupled to the tracks) and wheels (coupled to the slidable couplers), can move relative to one another.

Gyroscopic (position) sensors 61, 62 are preferably provided, one for each wheel 54, 56, though the device may be implemented with one gyroscopic sensor (used for both wheels). An electronic controller 60 preferably receives input signals from the joystick(s) or foot pedals and generates signals to the hub motors to drive the wheels appropriately. Electronic controller 60 is shown coupled to wheel frame 51 yet this controller may be located at any suitable location. While one electronic controller programmed to coordinate both wheels is sufficient, separate electronic controllers may be provided for each wheel. Suitable electronic controllers are known in the art.

Battery(ies) 68 power the drive motors. While shown attach to the wheel support, they may be at any suitable location. Suitable batteries are known in the art.

In Use

The electronic controller 60 is preferably configured to self-balance the vehicle in the fore-aft dimension by driving the respective wheels as needed based on position data from sensors 61, 62. The controller is also preferably configured to allow acceleration of the device to be initiated or controlled by forcing pitch change.

In addition, the electronic controller can also direct the motors to move the wheels 54, 56 independent of pitch changes, such that the wheels can move forward and backward relative to the seat 12 by sliding along the tracks 43, 44.

To move device 10 forward, for example, a rider moves a joystick or foot pedal (or other input device) in that direction. The electronic controller initiates forward movement (acceleration) by directing the motors 55, 57 to momentarily shift the wheels rearward of the vehicle's center of balance, and the vehicle begins to pitch forward due to gravity. The vehicle's self-balancing function reacts by accelerating forward to correct the pitch deviation, resulting in forward acceleration of the vehicle. The opposite process results in rearward movement or deceleration of forward movement.

Turning is preferably achieved (as taught in other self-balancing devices, such as those of Shane Chen, Dean Kamen and others) by driving the right and left wheels at different speeds and/or different directions. In one embodiment, two input controls (joysticks or pedals) could 30 be used, one each for each wheel. These input controls, sensors 61,62, and the respective drive motors could act independently, with the combined impact driving the vehicle forward, rearward and/or turning. In another embodiment, a single joystick may be used. In this case, a single gyroscopic sensor may be utilized and the electronic controller configured to drive the wheels at different speeds and/or directions depending on the position 5 of the joystick.

In yet another embodiment, approximating that of a car, the foot pedals could be used for forward and reverse, respectively, and a joystick, or even a steering wheel, provided for steering. These inputs would propagate to electronic controller 60 that would send corresponding signals to the drive motors.

With respect to the curve of tracks 43, 44, in general, a longer radius is beneficial. For example, if a 6' tall person is standing on a hoverboard (e.g., of U.S. Pat. No. 8,738,278) and that person has a center of gravity 4' off the ground than the radius of that individual on the hoverboard is 4'. A taller radius 6', 8', 10', 20' or more may be suitable. Also, a shorter radius, less than 4', 3', 2' or 1', for example, as shown below with a pendulum in FIG. 3, may be used.

Referring to FIG. 3, a rear-side perspective view of another embodiment of a self-balancing load-bearing device 25 110 in accordance with the present invention is shown. The components of this device are similar to those of device 10 of FIG. 1, however, instead of the curved tracks 43,44 and corresponding slidable couplers 52, device 110 has support members 171,172 extending upward from the right 30 and left side of the wheel shaft 151. These generally vertically-disposed support members have pendulum arms 173,174 coupled to a top thereof. The pendulum arms descend therefrom and are coupled to seat 112.

Seat 112 "rocks" or moves on the pendulum arms in the same or similar manner that seat 12 "rocks" or slides on tracks 43, 44. In FIG. 3, the radius of curvature is approximately the length of the pendulum arm. In FIG. 1, the radius of curvature of the track may more readily be made longer. Since seat 112 is coupled as a pendulum, the seat and the center of gravity can move relative to wheels 154, 156.

Referring to FIG. 4, a rear-side perspective view of yet another embodiment of a self-balancing load-bearing device 210 in accordance with the present invention is shown. While device 210 illustrates a seat, it should be recognized that this is a load platform 212. It may be flat, there may be no seat back, there may be a robot structure configured with or mounted on the load platform, or it may be otherwise configured. The load platform structure may be modified to support a human that has been injured or has less than complete function of all extremities, etc.

Mounted with a robot structure or sensors or an actuator arm or the like, device 210 may be used for service, entertainment, police work, military applications, warehouse work, and other uses. To support these and other uses, instead of a joystick, an antenna 231 may be provided with device 210. The antenna is preferably coupled to the electronic controller 260 and configured to receive data that may include remote control instructions, including but not limited to user input of the type that may be input through joystick 34 of device 10. The controller in turn drives wheels 254, 256.

Furthermore, the sensors, antenna and controller may be configured for self-driving or self-functioning, similar to a self-driving car.

In yet another embodiment, not shown, the present invention may be implemented in a single wheel or single-wheel structure (paired tires) embodiment. Support frame 51 or 151 may be coupled to a single wheel or a paired wheel structure.

It should be recognized that the present invention uses gravity to center the load of the device as opposed to the mechanical controlled positioning of the '723 patent or the counter-balance arrangement of Doi. This is a much simpler, cost-effective and elegant technique for achieving load centering. Further, it permits that creation of smaller format devices whether they are vehicles, robots or other. Consider a hoverboard or other device similar to that of U.S. Pat. No. 8,738,278, issued to Chen. To achieve balancing, it is helpful to stand and to have a higher center of gravity. That is why most self-balancing robots tend to be tall. The pendulum within an inverted pendulum permits shorter format yet with adequate balancing.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. An auto-balancing load-bearing device, comprising:
a first wheel and a first drive motor that drives the first wheel;
a second wheel and a second drive motor that drives the second wheel;
a first sensor;
an electronic controller that directs the first and second drive motors to drive the first and second wheels toward balancing the device; and
a load platform configured within the device so as to move under the force of gravity, relative to the first and second wheels, while the device is operating
wherein the load platform moves in fore-aft relative to the first and second wheels along a curved path and a curved track structure defines the curved path along which the load platform moves.

2. The device of claim 1, wherein the load platform has a center of gravity, the first wheel has a first axis of rotation and the second wheel has a second axis of rotation, and wherein, with the device in an upright, fore-aft centered position, the center of gravity of the movable load platform is above the first axis of rotation and the second axis of rotation.

3. The device of claim 1, wherein the curved track structure includes a curved track and a movable coupling member configured for movement along that track, one of the track and coupling member being coupled to the load platform and the other of the track and coupling member being coupled to the first and second wheels.

4. The device of claim 1, further comprising:
at least one of a hand-controlled and a foot-controlled user control signal input mechanism for input of user control signals.

5. The device of claim 1, further comprising:
an antenna coupled to the electronic controller and configured to receive control signals.

6. The device of claim 1, wherein the device is configured to operate as an inverted pendulum.

7. The device of claim 1, wherein, with the device in an upright, fore-aft centered position and on a horizontal surface, the curved path has a height forward of the first and second wheels and rearward of the first and second wheels that is greater than the height of the curved path vertically above the first and second wheels.

8. The device of claim 1, wherein the sensor and controller are configured for self-driving.

9. The device of claim 1, wherein the sensor is a position sensor.

10. An auto-balancing load-bearing device comprising:
a first wheel and a first drive motor;
a first sensor;
an electronic controller that directs the motor to drive the first wheel towards balancing the device;
a load platform configured within the device so as to move under the force of gravity, relative to the first wheel, while the device is operating;
a second wheel and a second drive motor that drives the second wheel, and wherein the load platform is configured to move under the force of gravity, relative to the first and second wheels, while the device is operating; and
an ascending support structure that ascends above the first and second wheels and a pendulum structure pivotally coupled to and descending from the ascending structure, wherein the pendulum structure includes the load platform and a coupling structure coupling the load platform to the ascending structure.

11. An auto-balancing load-bearing device, comprising:
a first wheel and a first drive motor;
a second wheel and a second drive motor;
a position sensor;
an electronic controller that directs the first motor and second motor to respectively drive the first and second wheels towards balancing the device;
a load platform having a center of gravity and configured within the device such that the center of gravity moves relative to the wheels along a curved path, the curved path, with the device in an upright fore-aft centered position, having a height forward or rearward of the wheels that is greater than the height of the path vertically above the wheels; and
a curved track structure that defines, at least in part, the curved path along which the center of gravity moves, and wherein the curved track structure includes a curved track and a movable coupling member configured for movement along that track, one of the track and coupling member being coupled to the load platform and the other of the track and coupling member being coupled to the first and second wheels.

12. The device of claim 11, wherein the controller is configured to direct the first and second motors based on control signals for speed and direction input by a user and position information from the position sensor.

13. The device of claim 11, further comprising at least one of a hand-controlled, a foot-controlled and an antenna-based user control signal input mechanism for input of user control signals.

14. An auto-balancing load-bearing device, comprising:
a first wheel and a first drive motor;
a second wheel and a second drive motor;
a position sensor;
an electronic controller that directs the first motor and second motor to respectively drive the first and second wheels towards balancing the device; and
a load platform configured within the device so as to move under the force of gravity, relative to the first and second wheels, while the device is operating;
wherein the load platform moves in fore-aft relative to the first and second wheels along a curved path; and
wherein, with the device in an upright, fore-aft centered position and on a horizontal surface, the curved path has a height forward of the first and second wheels and rearward of the first and second wheels that is greater than the height of the curved path vertically above the first and second wheels.

* * * * *